US007235942B2

(12) United States Patent
Nagaoka et al.

(10) Patent No.: US 7,235,942 B2
(45) Date of Patent: Jun. 26, 2007

(54) METHOD OF CONTROLLING THE LIFTING OF BOTTOM SECTIONS OF LYING FURNITURE SUCH AS A BED

(75) Inventors: Hiroshi Nagaoka, Tokyo (JP); Masao Horitani, Tokyo (JP); Satoru Inoue, Tokyo (JP)

(73) Assignee: Paramount Bed Co, Ltd., Tokyo (JP)

( * ) Notice: Subject to any disclaimer, the term of this patent is extended or adjusted under 35 U.S.C. 154(b) by 763 days.

(21) Appl. No.: 10/389,963

(22) Filed: Mar. 18, 2003

(65) Prior Publication Data

US 2004/0015321 A1 Jan. 22, 2004

(30) Foreign Application Priority Data

Mar. 18, 2002 (JP) ............................ 2002-075075

(51) Int. Cl.
*G05B 11/32* (2006.01)
*A61G 7/015* (2006.01)
*A61G 7/06* (2006.01)
*A61G 7/018* (2006.01)

(52) U.S. Cl. ...................... 318/466; 318/467; 318/568; 5/618

(58) Field of Classification Search ................ 318/280, 318/288, 460, 466, 430, 432; 15/611, 616, 15/618

See application file for complete search history.

(56) References Cited

U.S. PATENT DOCUMENTS

| | | | | | |
|---|---|---|---|---|---|
| 3,913,153 | A | * | 10/1975 | Adams et al. | 5/616 |
| 4,435,862 | A | * | 3/1984 | King et al. | 5/611 |
| 5,195,198 | A | * | 3/1993 | Travis | 5/618 |
| 6,000,077 | A | * | 12/1999 | Cyr | 5/618 |

* cited by examiner

*Primary Examiner*—Paul Ip
(74) *Attorney, Agent, or Firm*—Townsend & Banta

(57) ABSTRACT

This invention relates to a method of controlling the lifting of bottom sections of lying furniture such as a bed that has a back bottom section for lifting the back portion of a lying person and a knee bottom section for lifting his/her knee portion, in which the respective bottom sections can be lifted by the lifting mechanisms respectively provided for them, characterized in that the respective bottom sections are so constituted that they can be operated by the respectively provided lifting mechanisms either respectively independently or in an coordinative manner under a command selectively issued from an operation command means to a control means, and that position detecting means for detecting the lower limit positions of said respective bottom sections are installed at adequate places, wherein the control means lifts the respective bottoms sections in an coordinative manner subject to the condition that the position detecting means of the respective bottom sections detect the lower limit positions.

10 Claims, 9 Drawing Sheets

METHOD OF CONTROLLING THE LIFTING OF BOTTOM SECTIONS OF LYING FURNITURE SUCH AS A BED

FIELD OF THE INVENTION

The present invention generally relates to a bottom lifting control method for lying furniture such as a bed (hospital bed, ICU bed, long term care bed, etc.) or a stretcher. In more detail, it relates to a bottom lifting control method for lifting a back bottom section for lifting the back portion of a lying person and a knee bottom section for lifting his/her knee portion respectively independently and also in an coordinative manner for, for example, achieving the following objects, on lying furniture having the back bottom section and the knee bottom section, wherein the safety of the coordinative operation can be enhanced.

BACKGROUND OF THE INVENTION

Some of lying furniture such as beds and stretchers are respectively provided with a back bottom section for lifting the back portion of a lying person and a knee bottom section for lifting his/her knee portion, which can be respectively lifted by lifting mechanisms respectively provided for them.

Many examples of such lying furniture can be seen in U.S. Pat. Nos. 5,469,591, 5,448,789, 5,388,290, etc.

For example, the bed described in U.S. Pat. No. 5,469,591 has a back bottom section for lifting the back portion of a lying person, a knee bottom section for lifting his/her knee portion, and other bottom sections. On the undersides of the back bottom section and the knee bottom section, lifting arms each having a roller at the tip are installed pivotally rotatably, and the lifting arms can be driven and rotated by electric drive mechanisms such as motors.

In this constitution, the lifting arm of the back bottom section is pivotally rotated to let its roller lift the back bottom section in a pivotally rotating motion, for making it inclined, thereby lifting the back of the lying person, so that he/she can get up on the bed.

When the back bottom section is lifted and inclined like this, the lifting arm of the knee bottom section is pivotally rotated to let its roller lift the knee bottom section in a pivotally rotating motion, for making it inclined, thereby effectively preventing that the lying person slides forward if the back bottom section only is lifted.

That is, in the case where the person lying on the bed is lifted at his/her back, to get up, if the back bottom section is lifted, his/her body gradually slides forward since he/she is pressed forward at his/her back by the back bottom section. As a result, the point at which his/her body can be easily bent shifts from the pivot of the back bottom section. So, a force for bending the lumbar vertebra portion unlikely to be bent is applied from the back bottom section, to press the lumber vertebra portion and the abdominal portion of the lying person, making him/her feel displeasure.

Therefore, if the knee bottom section is lifted when the back bottom section is lifted, the body portion located above the inclined knee bottom section, i.e., femoral regions can receive the force applied from the back bottom section to press the lying person forward. As a result, the body sliding and displeasure feeling caused when his/her back only is lifted by means of the back bottom section can be prevented.

The conventional methods for also lifting the knee bottom section when lifting the back bottom section include, for example, the following.

a. As a first example, the drive mechanisms for lifting the back bottom section and the knee bottom section are operated respectively independently, and the lying person per se or a nurse simultaneously or alternately turns on and off the respective drive mechanisms, using, for example, remote control switches, to lift the back bottom section and the knee bottom section respectively to desired positions.

b. As a second example, a common motor or the like is used to drive the drive mechanisms of the back bottom section and the knee bottom section using an interlocking mechanism such as a link mechanism, so that the drive mechanisms of the back bottom section and the knee bottom section can be actuated in a mechanically interlocked manner, to lift the back bottom section and the knee bottom section to predetermined positions.

Problems of the Prior Art

However, these conventional methods have the following problems.

A. In the method a, the lying person or a nurse must simultaneously or alternately operate the respective drive mechanisms of the back bottom section and the knee bottom section. This operation is very complicated and troublesome, and the operator must be accustomed to it. Furthermore, it is difficult to always reproduce the optimum lifting states respectively for the back bottom section and the knee bottom section.

B. In the method b, since an interlocking mechanism is used, the lifting states of the back bottom section and the knee bottom section achieved in an interlocked manner are inevitably simple and cannot be adjusted or changed, and it is difficult to efficiently prevent both the body sliding and the displeasure feeling such as pressure feeling. Furthermore, the back bottom section and the knee bottom section cannot be operated respectively independently.

OBJECTS OF THE INVENTION

To solve the above-mentioned problems, an object of this invention is to provide lying furniture that has a back bottom section for lifting the back portion of a lying person and a knee bottom section for lifting his/her knee portion, in which the back bottom section and the knee bottom section can be operated respectively independently and also in an coordinative manner.

To achieve this object, in the lying furniture to which this invention is applied, the respective bottom sections are so constituted that they can be operated selectively either respectively independently or in an coordinative manner in response to an operation command, i.e., a lifting or lowering command issued to a controller from an operation command means such as an independent operation switch for operating each bottom section concerned independently or an coordinative operation switch for operating the bottom sections in an coordinative manner.

The control switches can be provided as remote control switches that can be operated by the person lying on the lying furniture, or can also be installed, for example, at the lower outside portion of the footboard that cannot be accessed by the person lying on the lying furniture. However, in the case where the person lying on the lying furniture is a dementia patient or child or any other person who does not understand the coordinative action of bottom sections, it may be very dangerous if he/she carries out the coordinative operation, especially coordinative lifting operation of the bottom sections. That is, in the case where each bottom section is independently operated, it is easy to understand the action since the control switch for operating each bottom section concerned corresponds to the lifting or lowering action of the bottom section caused by the operation. However, in the case of coordinative operation, since the operation of one control switch causes both the back bottom section and the knee bottom section to be operated, it can happen that a person who does not understand the coordinative action of the bottom sections is surprised at an unexpected bottom action, or that any unexpected accident occurs.

On the other hand, when an coordinative operation of the back bottom section and the knee bottom section is actually actuated, it is necessary to prevent that the lying person slides forward, and especially during lifting, it must be prevented that the angle formed between the back bottom section and the knee bottom section becomes gradually smaller, to gradually bend the abdominal region of the lying person, finally letting him/her feel a pressure.

As a method for adequately actuating the coordinative operation of the back bottom section and the knee bottom section, it can be considered to install the means for continuously detecting the respective positions of the back bottom section and the knee bottom section, for example, at the bottom sections per se or the lifting mechanisms, so that the bottom sections can be operated based on the positions detected by the position detecting means.

However, the method of installing the means for continuously detecting the respective positions of the back bottom section and the knee bottom section has a disadvantage that the cost is very high, and cannot be applied in every case.

So, the inventors studied intensively to actuate the coordinative operation of the back bottom section and the knee bottom section without using the means for continuously detecting the respective positions of the bottom sections, and contrived the following method.

In this method, the coordinative lifting of the back bottom section and the knee bottom section is such that at first the lifting of the knee bottom section is started from a state where all the bottom sections are kept down to lie flat, and at a time instant adequately later than the lifting start time instant, the lifting of the back bottom section is started; thereafter the knee bottom section is further lifted to once reach the preset highest position and then is lowered, while the back bottom section is lifted to a predetermined high position, wherein the time instant when the lifting of the back bottom section is started later than the time instant when the lifting of the knee bottom section is started, and/or the time instant when the knee bottom section reaches the highest position is judged in reference to the time elapsed after the time instant when the lifting of the knee bottom section is started.

In the above-mentioned method of actuating the coordinative operation of the back bottom section and the knee bottom section in reference to the elapsed time, the cost can be decreased since it is not necessary to install the means for continuously detecting the respective positions of the back bottom section and the knee bottom section.

However, according to this method, since the means for continuously detecting the respective positions of the back bottom section and the knee bottom section are not installed, the present positions of the bottom sections cannot be known, and a control sequence cannot be started from any intermediate step in the sequence.

If the back bottom section and the knee bottom section are operated, especially lifted in an coordinative manner even though their present positions are unknown, it can happen that the respective bottom sections are lifted further from their already lifted positions. In this case, the angle formed between the back bottom section and the knee bottom section becomes gradually smaller, to gradually bend the abdominal region of the lying person, finally letting him/her feel a pressure disadvantageously and dangerously.

Another object of this invention is to eliminate this danger.

SUMMARY OF THE INVENTION

At first, the first subject matter of this invention described in claim 1 proposes a method of controlling the lifting of bottom sections of lying furniture such as a bed that has a back bottom section for lifting the back portion of a lying person and a knee bottom section for lifting his/her knee portion, in which the respective bottom sections can be lifted by the lifting mechanisms respectively provided for them, characterized in that the respective bottom sections are so constituted that they can be operated by the respectively provided lifting mechanisms either respectively independently or in an coordinative manner under a command selectively issued from an operation command means to a control means, and that position detecting means for detecting the lower limit positions of said respective bottom sections are installed at adequate places, wherein the control means lifts the respective bottoms sections in an coordinative manner, subject to the condition that the position detecting means of the respective bottom sections detect the lower limit positions.

According to this method, even if the operation command means issues a command for lifting the respective bottom sections in an coordinative manner, to a control means, the control means does not lifts the respective bottom sections in an coordinative manner unless the respective bottom sections stay at their lower limit positions. So, it does not happen safely that any bottom section is lifted further.

In the second subject matter of this invention described in claim 2 in accordance with claim 1, in the case where the position detecting means of the respective bottom sections do not detect the lower limit positions, the control means does not accept an coordinative lifting command from the operation command means.

According to this method, in the case where the respective bottom sections do not stay at their lower limit positions, even if the operation command means issues an coordinative lifting command to the control means, the bottom sections are not lifted at all. So, it does not happen safety that the respective bottom sections already in lifted positions are further lifted in an coordinative manner to positions higher than necessary. However, in this method, if any other command than an coordinative lifting command is issued, the control means can operate the bottom sections in response to the command. For example, if the operation command means issues an coordinative lowering command or an independent lowering command for each bottom section, to lower the back bottom section and/or the knee bottom section to their lower limit positions, an coordinative lifting command issued thereafter from the operation command means to the control means allows the back bottom section and the knee bottom section to be lifted in an coordinative manner.

In the third subject matter of this invention described in claim 3 in accordance with claim 1, in the case where the position detecting means of the respective bottom sections do not detect the lower limit positions, the control means lowers the respective bottom sections in response to an coordinative lifting command from the operation command means.

According to this method, in the case where the respective bottom sections do not stay at their lower limit positions, if the operation command means issues an coordinative lifting command for the respective bottom sections to the control means, the back bottom section and the knee bottom section are automatically lowered to their lower limit positions, to bring about a state where the bottom sections can be lifted in an coordinative manner if another coordinative lifting command is issued. After this state is brought about, if the operation command means issues another coordinative lifting command for the back bottom section and the knee bottom section, the bottom sections can be lifted in an coordinative manner.

In the fourth subject matter of this invention described in claim 4 in accordance with claim 1, in the case where the position detecting means of the respective bottom sections do not detect the lower limit positions, the control means lowers the respective bottom sections in response to an coordinative lifting command from the operation command means, and if the position detecting means detects the lower limit positions as a result, the control means lifts the respective bottom sections in an coordinative manner.

According to this method, in the case where the respective bottom sections do not stay at their lower limit positions, if the operation command means issues an coordinative lifting command for the respective bottom sections to the control means, the back bottom section and the knee bottom section are automatically lowered to their lower limit positions, to bring about a state where the bottom sections can be lifted in an coordinative manner in response to the command, and after this state is brought about, the respective bottom sections are automatically lifted in an coordinative manner.

In the fifth subject matter of this invention described in claim 5 in accordance with claim 1, in the case where the position detecting means of the respective bottom sections do not detect the lower limit positions, the control means starts counting, in response to an coordinative lifting command from the operation command means, the time elapsed after the time instant when it receives the command; if the control means standing by in this state receives another coordinative lifting command within a predetermined time, it lowers the respective bottom sections; and if the position detecting means of the respective bottom sections detect the lower limit positions as a result, the control means lifts the respective bottom sections in an coordinative manner.

According to this method, in the case where the respective bottom sections do not stay at their lower limit positions, if the operation command means issues a command for lifting the respective bottom sections in an coordinative manner, to the control means, the control means that receives this first lifting command does not actuate anything, but merely stands by, and if another coordinative lifting command is issued within a predetermined time, the control means treats the command as an coordinative lifting command and automatically lowers the back bottom section and the knee bottom section to their lower limit positions, to bring about a state where they can be lifted in an coordinative manner in response to the command. After this state is brought about, the respective bottom sections are automatically lifted in an coordinative manner.

In the sixth subject matter of this invention described in claim 6 according to any of the above-mentioned claims, the coordinative lifting action of the back bottom section and the knee bottom section is such that at first the lifting of the knee bottom section is started from a state where all the bottom sections are kept down to lie flat, and at a time instant adequately later than the lifting start time instant, the lifting of the back bottom section is started; thereafter the knee bottom section is further lifted to reach the preset highest position and then is lowered, while the back bottom section is lifted to a predetermined high position, wherein the time instant when the lifting of the back bottom section is started later than the time instant when the lifting of the knee bottom section is started, and/or the time instant when the knee bottom section reaches the highest position is judged in reference to the time elapsed after the time instant when the lifting of the knee bottom section is started.

In the coordinative lifting of the back bottom section and the knee bottom section, if the lifting of the back bottom section and the lifting of the knee bottom section are continued without control, the angle formed between the back bottom section and the knee bottom section becomes gradually smaller, to gradually bend the abdominal region of the lying person, finally letting him/her feel a pressure. However, according to the method of this invention, the lifting of the knee bottom section is not continued without control, but is limited to a preset high position. Hence, the knee bottom section is maintained at the position or lowered from the position. So, it does not happen that the angle formed between the back bottom section and the knee bottom section becomes smaller than a certain angle. Therefore, it can be prevented that the abdominal region of the lying person is gradually bent as a result to let him/her feel a pressure.

DETAILED DESCRIPTION OF PREFERRED EMBODIMENTS

Preferred embodiments of this invention are described below in more detail in reference to the attached drawings.

As described above, FIG. 1 is a side view showing, as an example, the entire bed to which the method of controlling the lifting of bottom sections of this invention is applied. The illustrated bed 2 is composed of a back bottom section 1*a* for lifting the back portion of a lying person, a knee bottom section 1*b* for lifting his/her knee portion, and a leg bottom section 1*c* corresponding to his/her leg portion. The back bottom section 1*a*, the knee bottom section 1*b* and the leg bottom section 1*c* are connected with each other to form a bendable bottom corresponding to the whole body, and supported by a bed frame 6. The support mechanism for supporting and lifting the divided plural bottom sections on the bed frame 6 is not illustrated here since it is well known.

In the bed of this example, the bottom corresponding to the whole body is composed of the above-mentioned divided three bottom sections 1*a*, 1*b* and 1*c* connected with each other. However, the bottom can also be divided into four portions, or as described, for example, in the afore said U.S. Pat. Nos. 5,469,591, 5,448,789 and 5,388,290, many members can be connected with each other to form a bendable bottom. Anyway the bed to which this invention is applied is only required to have a back bottom section for lifting the back portion of the lying person and a knee bottom section for lifting his/her knee portion.

Furthermore, the lifting mechanisms for lifting the back bottom section 1*a* and the knee bottom 1*b* portion can be the mechanisms as described, for example, in the aforesaid U.S. Pat. Nos. 5,469,591, 5,448,789 and 5,388,290. That is, a lifting arm having a roller at the tip, which can be pivotally rotated by an electric drive mechanism such as a motor, can be installed to let the roller lift and support each bottom section, or a linear motion member with a rotary motion-linear motion conversion mechanism consisting of a threaded shaft and a female screw engaged with it can be connected with an arm installed on the underside of each bottom section.

The lifting mechanisms for lifting the back bottom section 1*a* and the knee bottom section 1*b* are so constituted that they can be of course controlled in an coordinative manner as described later, or in addition, can also be controlled to actuate the respective bottom sections individually as required.

Figure 1:
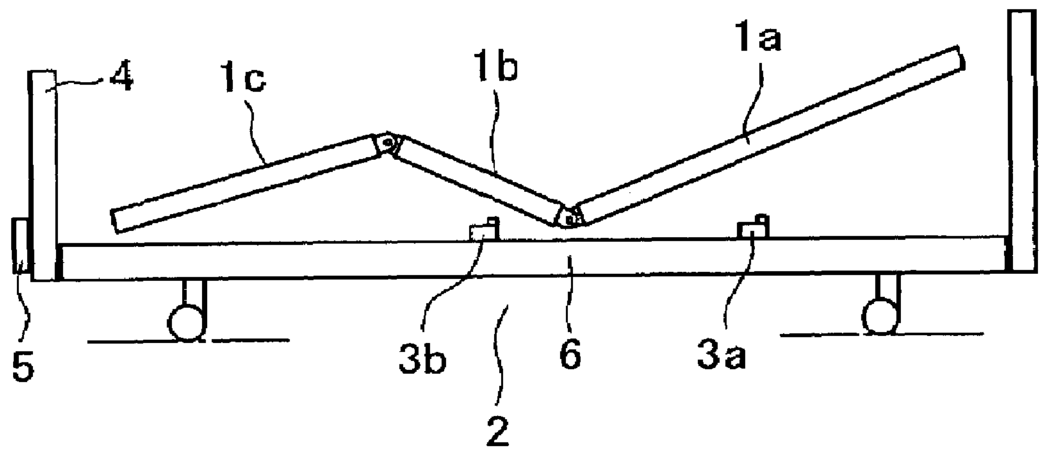
FIG. 1 is a side view showing, as an example, the entire bed to which the method of controlling the lifting of bottom sections of this invention is applied, in which the back bottom section and the knee bottom section are lifted in an coordinative manner.
Figure 2:
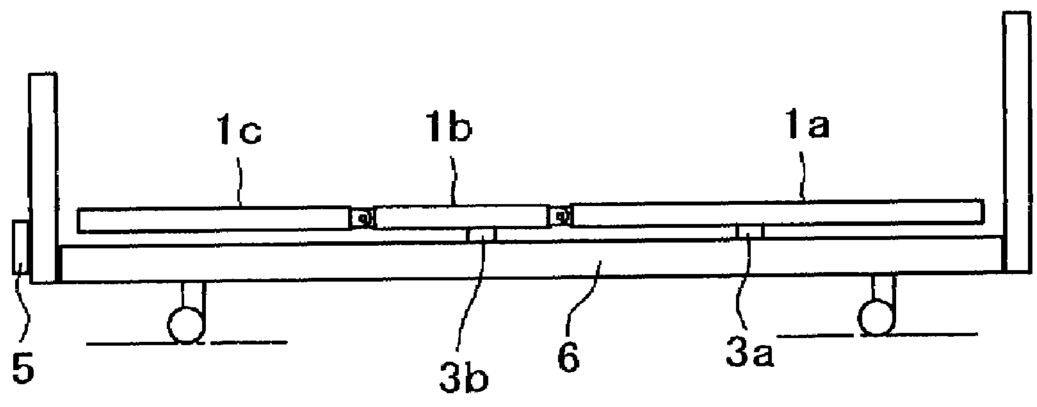
FIG. 2 is a side view showing, as an example, the entire bed to which the method of controlling the lifting of bottom sections of this invention is applied, in which the back bottom section and the knee bottom section are lowered to their lower limit positions so that the entire bottom lies flat.
Figure 3:
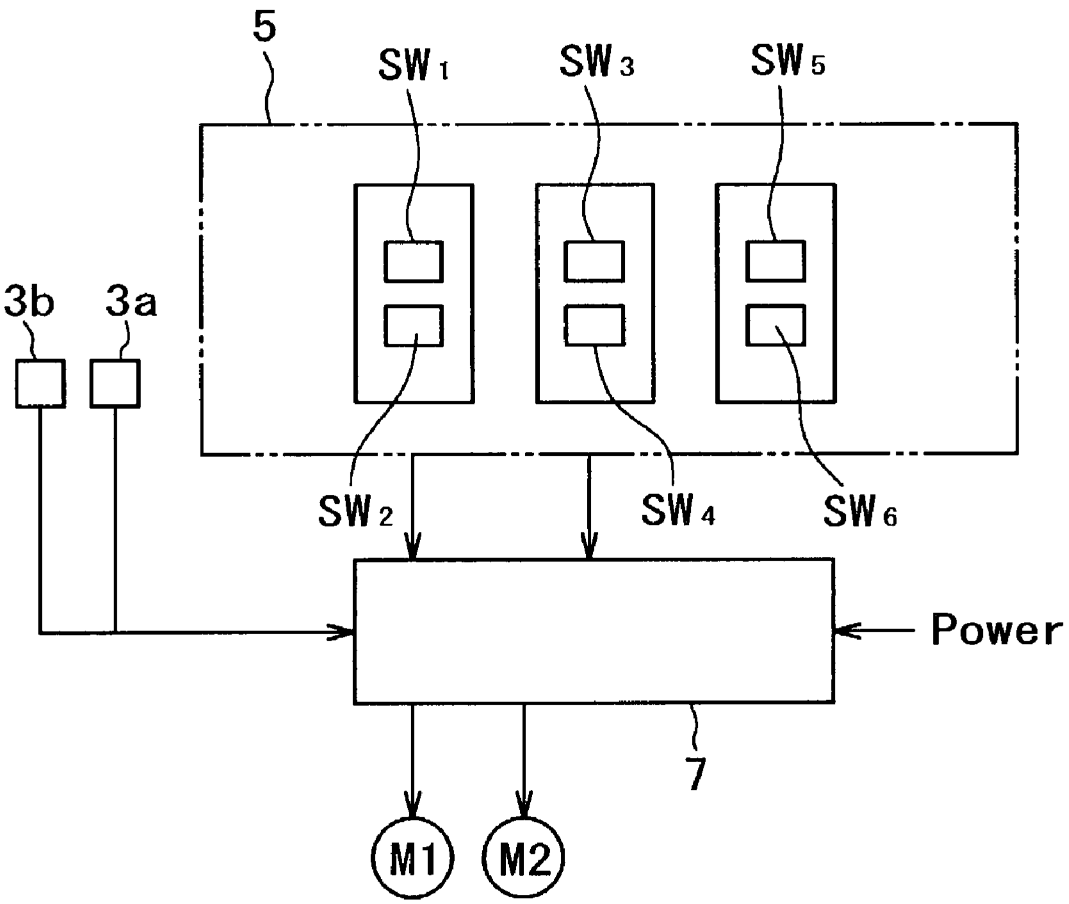
FIG. 3 is a diagram showing, as an example, the control mechanism of the bed to which the method of controlling the lifting of bottom sections of this invention is applied.

An example of the control mechanism for the bed to which the method of controlling the lifting of bottom sections of this invention is applied is described in reference to FIGS. 1 and 2. Symbol 4 denotes a footboard, and a control panel 5 is installed on the lower outside portion of the footboard 4. The control panel 5 contains the control switches shown in FIG. 2.

The control panel 5 contains switches SW1 and SW2 for lifting and lowering the back bottom section 1*a* and switches SW3 and SW4 for lifting and lowering the knee bottom section 1*b*. These switches allow the back bottom section and the knee bottom section to be lifted and lowered independently. That is, these switches SW1, SW2, SW3 and SW4 are the independent operation switches described before.

The control panel 5 also contains switches for lifting and lowering the back bottom section 1*a* and the knee bottom section 1*b* in an coordinative manner, i.e., lifting and lowering switches SW5 and SW6 in addition to the above-mentioned switches. That is, these switches SW5 and SW6 are the coordinative operation switches described before.

These respective switches can be mounted on the control panel 5, and also on a remote controller.

On the other hand, symbols 3*a* and 3*b* denote position detecting means such as limit switches. The position detecting means 3*a* and 3*b* are installed, for example, on the bed frame 6 of the bed 2, to detect the lower limit positions of the back bottom section 1*a* and the knee bottom section 1*b*, i.e., the state where the bottom sections are supported horizontally. The position detecting means 3*a* and 3*b* are turned on (or off) when the respective bottom sections stay at their lower limit positions.

Symbol 7 denotes a controller that controls the on and off actions of the motors M1 and M2 used for operating the back bottom section 1*a* and the knee bottom section 1*b*. The output signals of the respective switches and the output signals of the position detecting means 3*a* and 3*b* are applied to the controller 7.

A particular example of the coordinative operation of the back bottom section 1*a* and the knee bottom section 1*b* in this constitution is described below. This coordinative operation corresponds to the coordinative operation described in claim 6.

Figure 4:
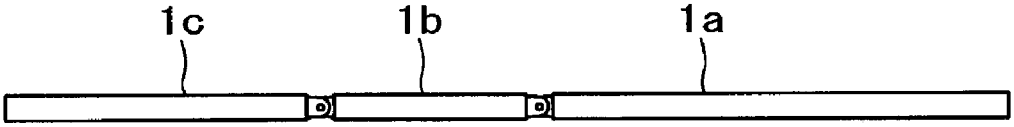
FIG. 4 is a side view showing the entire form of a bottom in a state all the bottom sections are kept down to lie flat, in the case where the method of controlling the lifting of bottom sections of this invention is applied to a bed.

FIG. 4 shows a state where all the bottom sections 1*a*, 1*b* and 1*c* are kept down to lie flat, and in this state, a person such as a patient lies in an ordinary position. To let the lying person get up by lifting his/her back portion from this state, the switch SW5 is turned on to issue a command to the controller 7.

Figure 5:
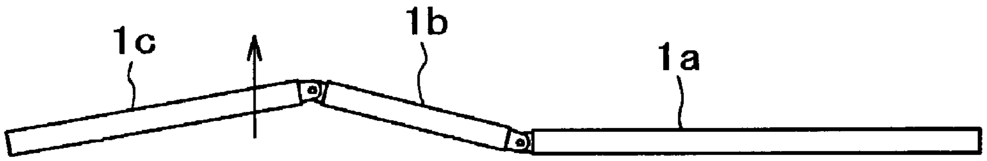
FIG. 5 is a side view showing the entire form of a bottom in another phase in the lifting action, in the case where the method of controlling the lifting of bottom sections of this invention is applied to a bed.
Figure 10:
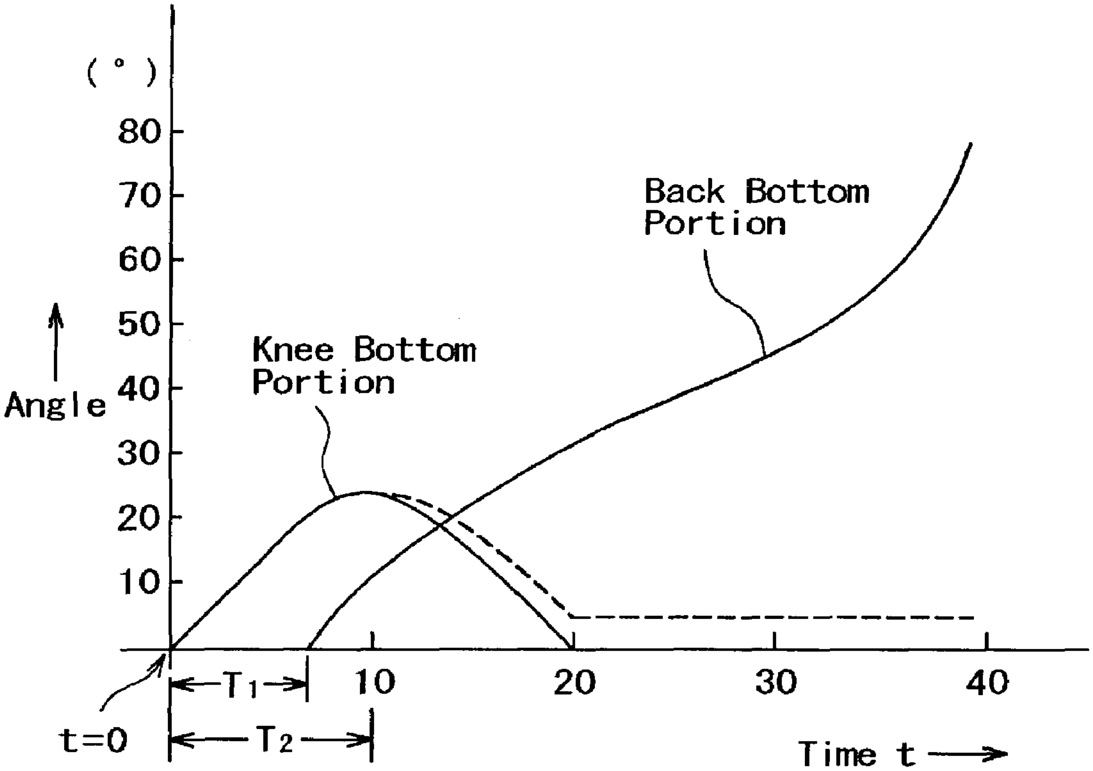
FIG. 10 is a diagram showing an example of how the inclination angles of the back bottom section and the knee bottom section change in relation with the elapsed time, in the case where the method of controlling the lifting of bottom sections of this invention is applied.

Receiving the command, the controller 7 actuates at first the lifting mechanism of the knee bottom section 1*b* as shown in FIG. 5, to start lifting the knee bottom section 1*b* only. The time instant when the lifting of the knee bottom section 1*b* is started is t=0 in FIG. 10.

Figure 6:
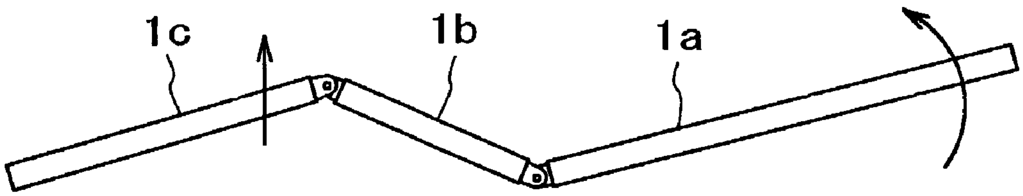
FIG. 6 is a side view showing the entire form of a bottom in a further other phase in the lifting action, in the case where the method of controlling the lifting of bottom sections of this invention is applied to a bed.

Then, receiving another command, the controller 7 starts lifting the back bottom section 1*a* at the time instant (t=T1) adequately later than the time instant when the lifting of the knee bottom section 1*b* is started, and thereafter as shown in FIG. 6, both the back bottom section 1*a* and the knee bottom section 1*b* are further lifted.

As described above, for pivotally rotating and lifting the back bottom section 1*a* from a flat state where all the bottom sections are kept down to lie flat, at first, the lifting of the knee bottom section 1*b* is started. Since the knee bottom section 1*b* is lifted, the knee bottom section 1*b* supports the position of the waist of the lying person, and therefore even if the lifting of the back bottom section is started in this state to gradually make the back bottom section steeply inclined, it can be prevented that the lying person is pressed at his/her back to slide forward.

As described before, the lifting of the knee bottom section 1*b* can also be started simultaneously with or later than the lifting of the back bottom section 1*a*.

If the lifting of the back bottom section 1*a* and the lifting of the knee bottom section 1*b* are continued from the state of FIG. 6 further without control, the angle formed between the back bottom section 1*a* and the knee bottom section 1*b* becomes gradually smaller to gradually bend the abdominal region of the lying person, finally letting him/her feel a pressure.

Figure 7:
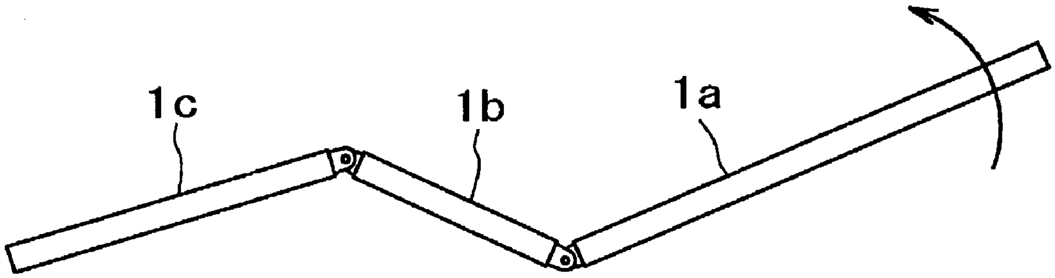
FIG. 7 is a side view showing the entire form of a bottom in a still further other phase in the lifting action, in the case where the method of controlling the lifting of bottom sections of this invention is applied to a bed.
Figure 8:
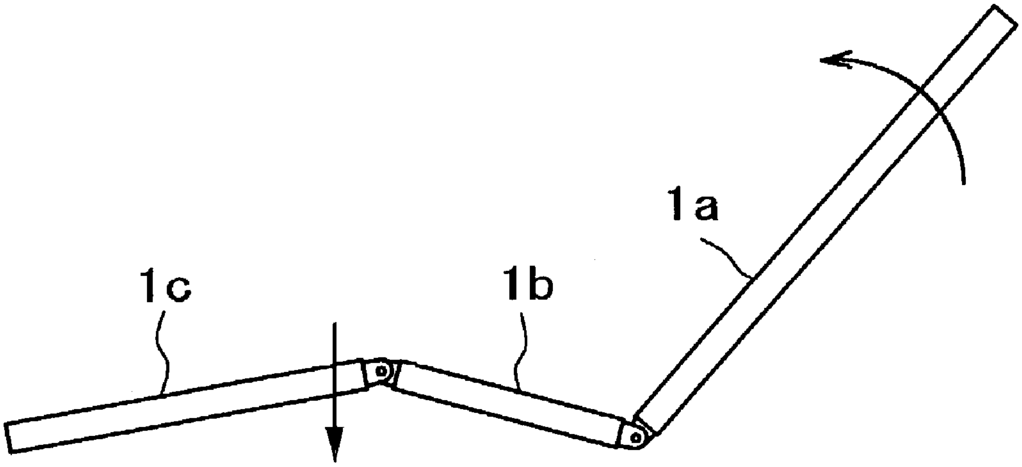
FIG. 8 is a side view showing the entire form of a bottom in a still further other phase in the lifting action, in the case where the method of controlling the lifting of bottom sections of this invention is applied to a bed.
Figure 9:
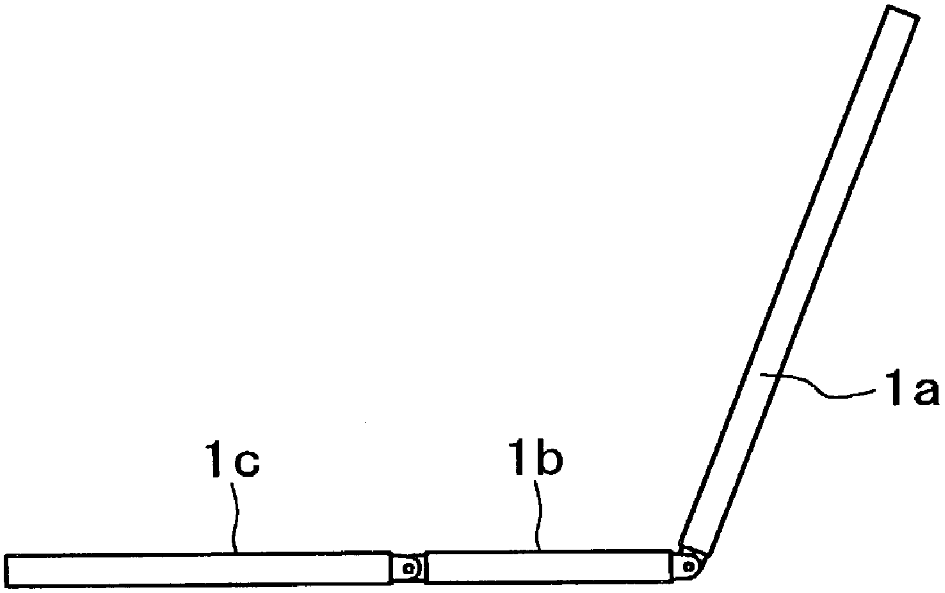
FIG. 9 is a side view showing the entire form of a bottom in a still further other phase in the lifting action, in the case where the method of controlling the lifting of bottom sections of this invention is applied to a bed.

To prevent such an inconvenience, while the back bottom section is lifted to a predetermined higher position, such control is required to ensure that the knee bottom section is lifted to reach the preset highest position (the state of FIG. 7) and then is lowered as shown in FIG. 8, before the back bottom section reaches the most inclined state. The control for lowering the knee bottom section like this can be based on the elapsed time, and in this case, the lowering can be started when the time elapsed after start of operation reaches a preset value. As another method, a pressure sensor can be installed between the back bottom section and the lying person, and in this case, the lowering can be started when the pressure reaches a preset value.

Since the knee bottom section 1*b* is lowered like this, even if the back bottom section 1*a* is further lifted to form a sharp angle, the angle of the knee bottom section 1*b* becomes gradually smaller. So, the angle formed between the back bottom section 1*a* and the knee bottom section 1*b* does not become smaller as shown in FIG. 8, and therefore it can be prevented that the abdominal region of the lying person is gradually bent between the back bottom section 1*a* and the knee bottom section 1*b* to let the lying person feel a pressure.

The control action of the back bottom section 1*a* and the knee bottom section 1*b* to which this invention is applied has been described as an action in the case where the back bottom section is pivotally rotated and lifted to be kept inclined from a flat state where all the bottom sections are kept down to lie flat. The action in the case where all the bottom sections are lowered to be flat from a lifted state where the back bottom section is pivotally rotated and lifted to be most inclined, is reverse to the action explained for the case of lifting. So, the action for the latter case of lowering is not described here to avoid double explanation.

Also in the action for lowering, since the knee bottom section lifted to a certain position or the highest position is lowered thereafter. So, the action of the knee bottom section like this in the case of lowering can prevent that the person lying on the bottom slides forward, and when the entire bottom becomes flat, the person lying on the bottom is not displaced. Therefore, the trouble that the caregiver must return the lying person to the original position can be saved.

In this invention, as the case may be, the back bottom section 1*a* and the knee bottom section 1*b* can be lowered to lie flat in an coordinative action different from the action reverse to the action taken in the case where the back bottom section is pivotally rotated and lifted to be inclined from a flat state where all the bottom sections are kept down to lie flat. For example, in the case where the back bottom section is lowered, the lifting of the knee bottom section can precede the lowering of the back bottom section.

The control flow in respective embodiments of the bottom lifting control method of this invention is described below in reference to FIGS. 11 through 14.

Figure 11:
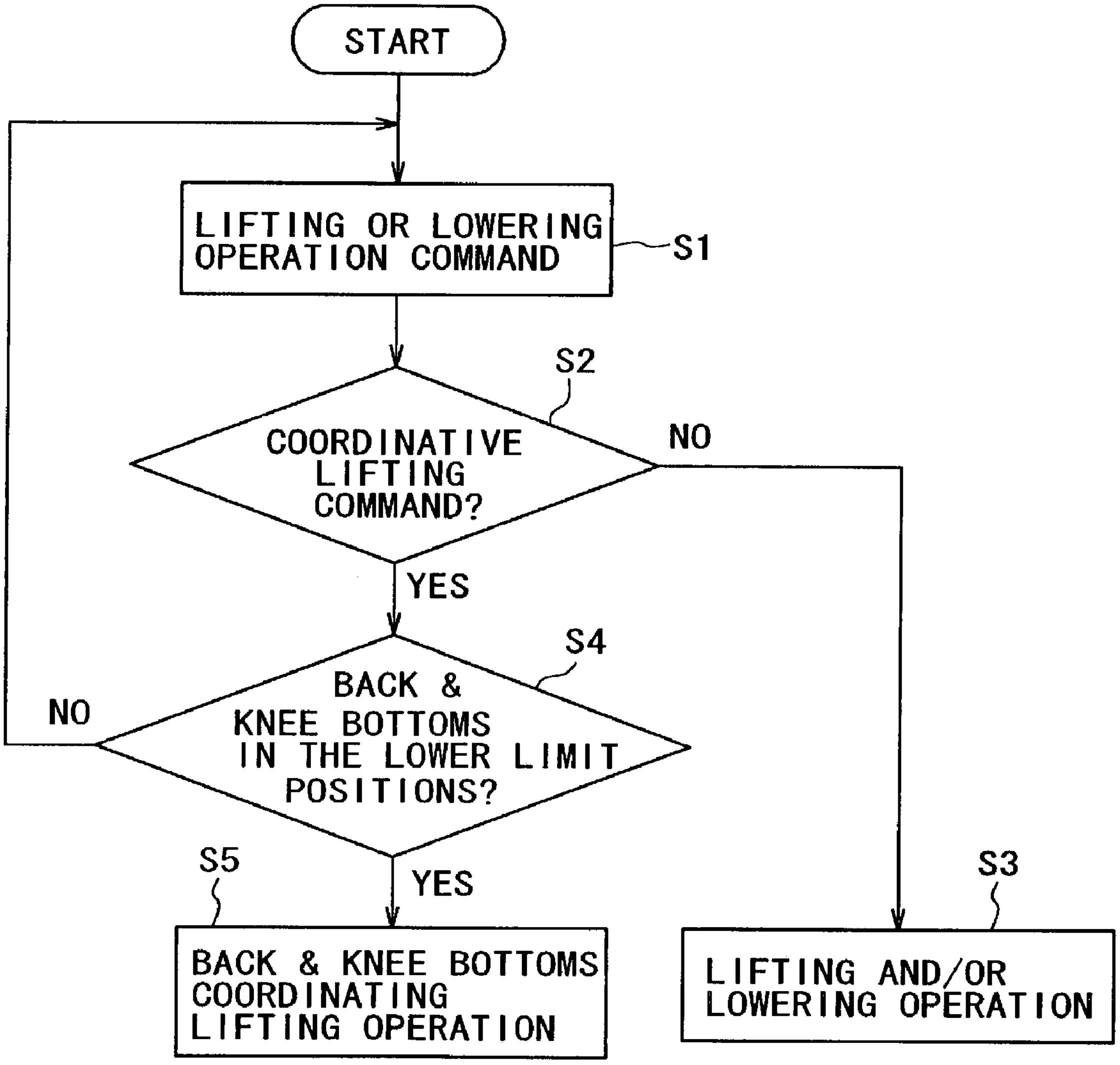
FIG. 11 is a flowchart showing the flow of control in the method of controlling the lifting of bottom sections as the second subject matter of this invention.

At first, FIG. 11 is a flowchart for illustrating the control flow in an embodiment corresponding to the second subject matter of this invention described in claim 2. The action is described below.

At first, at step S1, any one of control switches SW1 to SW6 (or any one of the switches mounted on a remote controller or the like) is turned on to issue a corresponding operation command to the controller 7. At step S2, whether the operation command is an coordinative lifting command for the back bottom section 1*a* and the knee bottom section 1*b*, or any other command, i.e., an coordinative lowering command or an independent operation command is judged. As a result, in the case where the operation command is judged to be any other command than an coordinative lifting command, the operation responding to the command is carried out at step S3.

On the other hand, if the operation command is judged to be an coordinative lifting command at step S2, whether the back bottom section 1*a* and the knee bottom section 1*b* stay at their lower limit positions, i.e., are kept down to lie flat is judged at step S4 in reference to the output signals of the position detecting means 3*a* and 3*b*.

If it is judged, as a result, that the bottom sections do not stay at their lower limit positions, no action takes place, and an operation command is waited for at the next step S1. On the other hand, if it is judged that the bottom sections stay at their lower limit positions, the back bottom section 1*a* and the knee bottom section 1*b* are lifted in an coordinative manner at step S5 in response to the operation command.

According to this method, as described above, in the case where the respective bottom sections do not stay at their lower limit positions, even if the operation command means issues an coordinative lifting command to the control means, no operation occurs. So, it does not happen safely that the respective bottom sections already staying at lifted positions are further lifted in an coordinative manner to the positions higher than necessary. However, in this method, if the command is any other command than an coordinative lifting command, the control means can operate the bottom sections in response to the command. For example, in the case where the operation command means issues an coordinative lowering command or an independent lowering command for each bottom section, to lower the back bottom section and the knee bottom section to their lower limit positions, if the operation command means issues an coordinative lifting command to the control means later, the back bottom section and the knee bottom section can be lifted in an coordinative manner.

Figure 12:
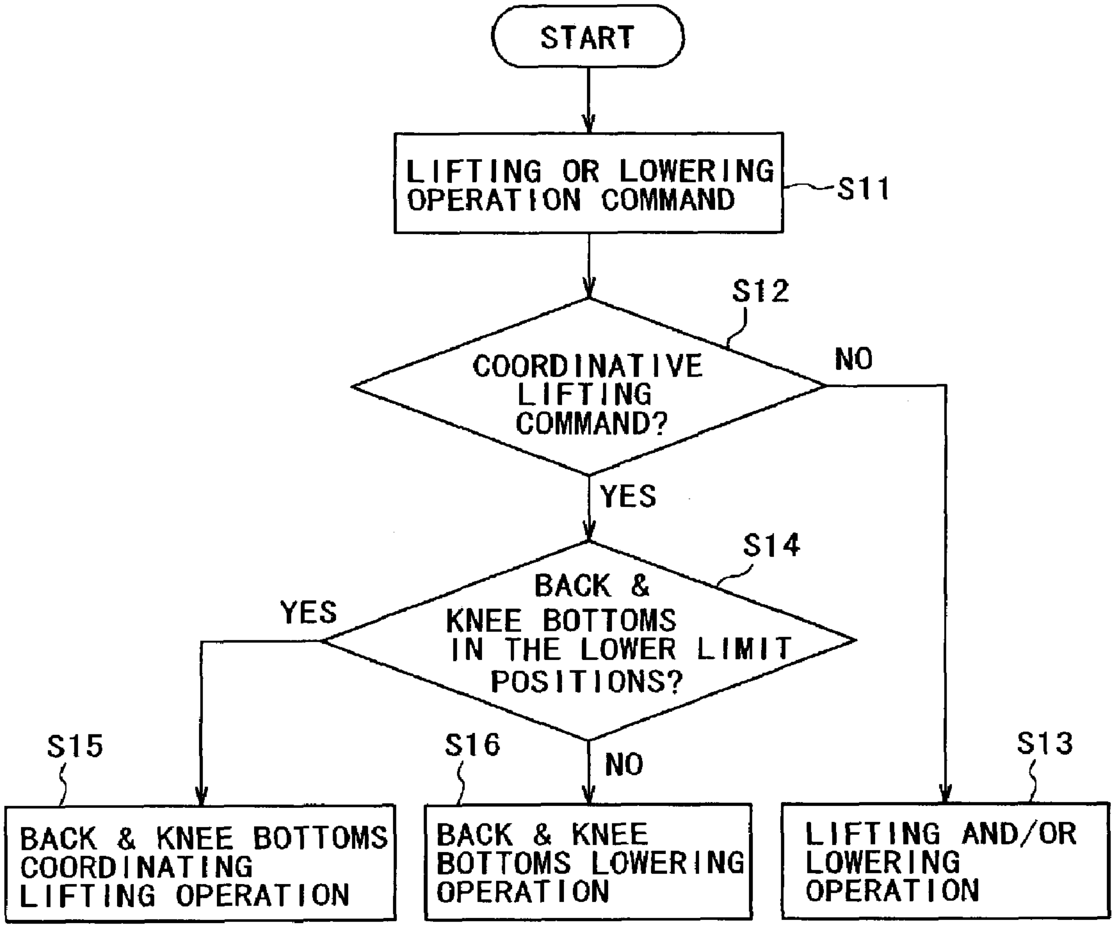
FIG. 12 is a flowchart showing the flow of control in the method of controlling the lifting of bottom sections as the third subject matter of this invention.

FIG. 12 is a flowchart for illustrating the control flow in an embodiment corresponding to the third subject matter of this invention described in claim 3. The action is described below.

In the control flow, since the respective actions at steps S11 to S14 are identical with the actions of said steps S1 to S4, they are not described here to avoid double explanation.

In this embodiment, if it is judged, at step S4, that the back bottom section 1*a* and the knee bottom section 1*b* stay at their lower limit positions, the back bottom section 1*a* and the knee bottom section 1*b* are lifted in an coordinative manner in response to the operation command at step S5. On the other hand, if it is judged that the bottom sections do not stay at their lower limit positions, the back bottom section 1*a* and the knee bottom section 1*b* are lowered to their lower limit positions at step S16.

According to this method, as described above, in the case where the respective bottom sections 1*a* and 1*b* do not stay at their lower limit positions, if the operation command means issues an coordinative lifting command for the respective bottom sections 1*a* and 1*b* to the controller 7, the back bottom section 1*a* and the knee bottom section 1*b* are automatically lowered to their lower limit positions, to bring about a state where they can be lifted in an coordinative manner in response to another coordinative lifting command. If the operation command means issues another coordinative command for the back bottom section 1*a* and the knee bottom section 1*b* after this state is brought about, the bottom sections can now be lifted in an coordinative manner.

Figure 13:
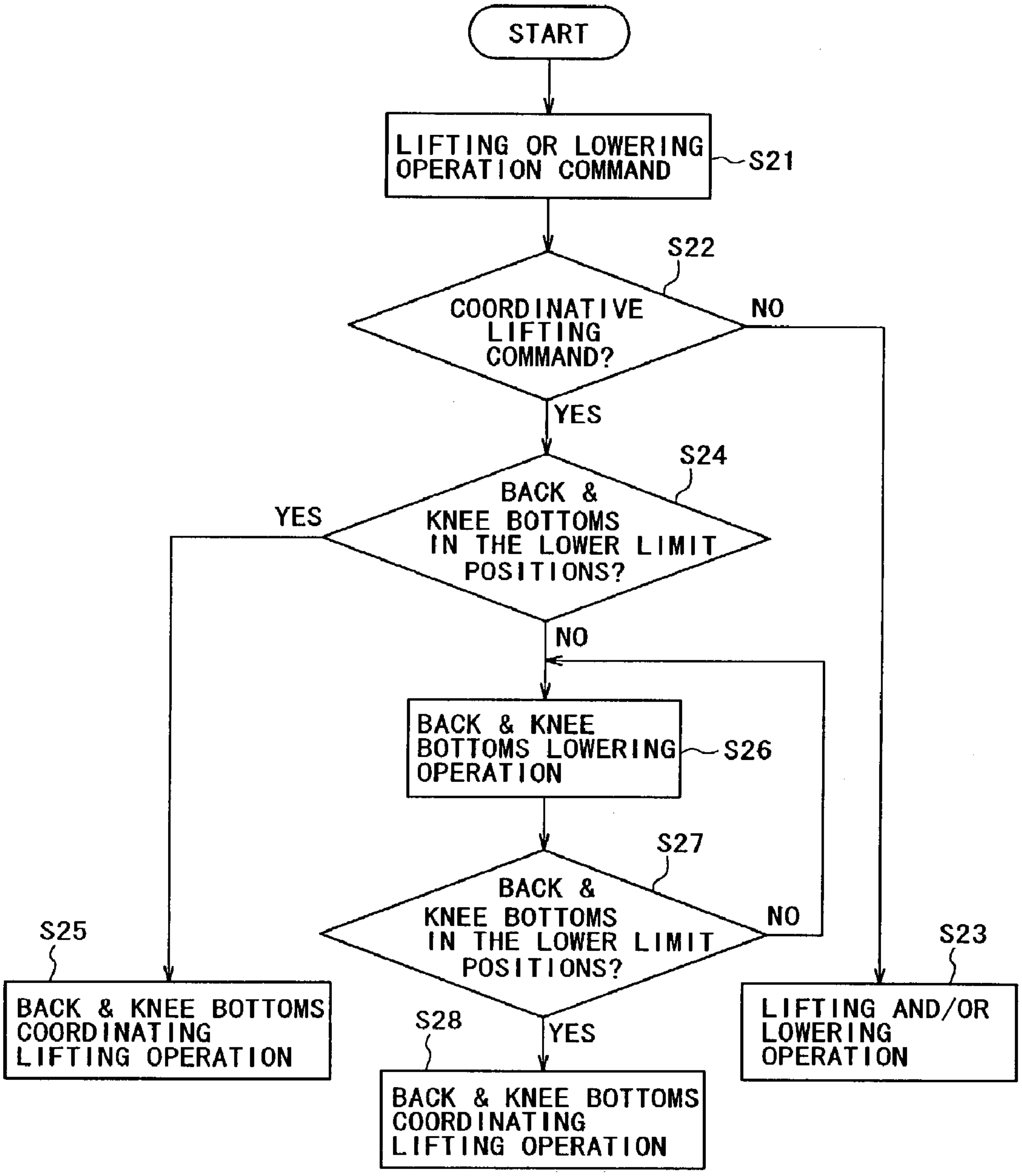
FIG. 13 is a flowchart showing the flow of control in the method of controlling the lifting of bottom sections as the fourth subject matter of this invention.

FIG. 13 is a flowchart for illustrating the control flow in an embodiment corresponding to the fourth subject matter of this invention described in claim 4. The action is described below.

In this control flow, since the respective actions at steps S21 to S26 are identical with the actions of said steps S11 to S16, they are not described here to avoid double explanation.

In this embodiment, the back bottom section 1*a* and the knee bottom section 1*b* are lowered at step S26, and the output signals of the position detecting means 3*a* and 3*b* are referred to at step S27, to judge whether or not the back bottom section 1*a* and the knee bottom section 1*b* stay at their lower limit positions, i.e., lie flat. If it is judged that they do not stay at their lower limit positions, they are further lowered at step S26, and if it is judged that they stay at their lower limit positions, the back bottom section and the knee bottom section can be lifted in an coordinative manner at step S28.

According to this method, in the case where the respective bottom sections 1*a* and 1*b* do not stay at their lower limit positions, if the operation command means issues an coordinative lifting command for the respective bottom sections 1*a* and 1*b* to the controller 7, the back bottom section 1*a* and the knee bottom section 1*b* are automatically lowered to their lower limit positions, to bring about a state where they can be lifted in an coordinative manner in response to the coordinative lifting command. So, after this state is brought about, the bottom sections can be automatically lifted in an coordinative manner.

Figure 14:
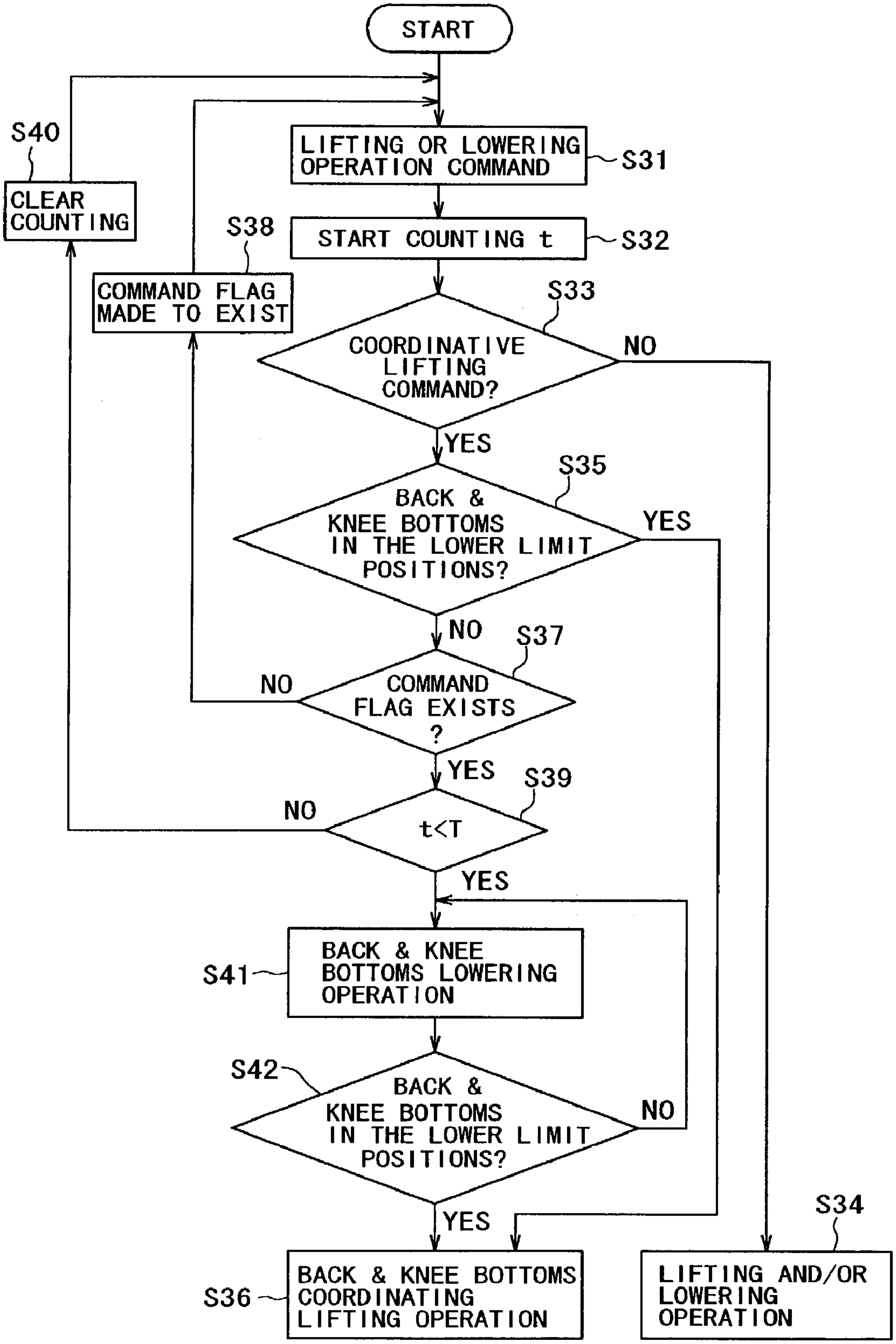
FIG. 14 is a flowchart showing the flow of control in the method of controlling the lifting of bottom sections as the fifth subject matter of this invention.

FIG. 14 is a flowchart for illustrating the flow control in an embodiment corresponding to the fifth subject matter of this invention described in claim 5. The action is described below.

At first, at step S31, if any of the control switches SW1 to SW6 (or any of the switches mounted on a remote controller or the like) is turned on to issue an operation command to the controller 7, time counting is started at step S32. Then, at step S33, whether the operation command is an coordinative lifting command for the back bottom section 1*a* and the knee bottom section 1*b* or any other operation command such as an coordinative lowering command or an independent operation command is judged. If the operation command is judged to be any other command than an coordinative lifting command, the operation in response to the command is carried out at step S34.

On the other hand, if it is judged, at step S33, that the command is an coordinative lifting command, the output signals of the position detecting means 3*a* and 3*b* are referred to at step S35, to judge whether or not the back bottom section 1*a* and the knee bottom section 1*b* stay at their lower limit positions, i.e., lie flat.

If it is judged, at step S35, that the back bottom section 1*a* and the knee bottom section 1*b* stay at their lower limit positions, the back bottom section 1*a* and the knee bottom section 1*b* are lifted in an coordinative manner at step S36 in response to the command. On the other hand, if it is judged that they do not stay at their lower limit positions, whether or not a command flag for the coordinative lifting command exists is judged at step S37.

If there is no command flag, that is, if the coordinative lifting command is issued for the first time, a command flag is made to exist at step S38, and the controller stands by at step S31 till another operation command is issued.

If another operation command is issued at step S31 after lapse of a certain time, to reach step S37 through the above-mentioned respective steps, since a command flag exists, the counted time t is compared with the preset time T at step S39.

If the counted time is found to be shorter than the preset time as a result, that is, if another coordinative lifting command is issued before the preset time passes after the first coordinative lifting command, step 41 comes. Step S41 corresponds to said step S26. Since the actions at steps S41, S42 and S36 are identical with those at said steps S26, S27 and S28, they are not described here to avoid double explanation.

On the other hand, if the counted time is found to be longer than the preset time as a result of comparison at step S39, that is, if another coordinative lifting command is issued after lapse of the preset time subsequent to the first coordinative lifting command, the counted time is cleared at step S40, and the controller stands by at step S31 till a further other operation command is issued.

According to this method, in the case where the respective bottom sections 1*a* and 1*b* do not stay at their lower limit positions, if the operation command means issues an coordinative lifting command for the respective bottom sections 1 and 1*b* to the controller 7, the controller 7 receiving this first coordinative lifting command does not act at all but merely stands by, and when the next coordinative lifting command is issued within a predetermined time, it is treated as an coordinative lifting command to automatically lower the back bottom section 1*a* and the knee bottom section 1*b* to their lower limit positions for bringing about a state where the respective bottom sections can be lifted in an coordinative manner in response to the coordinative lifting command. After this state is brought about, the respective bottom sections are further automatically lifted in an coordinative manner.

INDUSTRIAL APPLICABILITY

In lying furniture that has a back bottom section for lifting the back portion of a lying person and a knee bottom section for lifting his/her knee portion of this invention, the respective bottom sections are so constituted that they can be operated selectively either respectively independently or in an coordinative manner. Therefore, compared with a case where independent operation switches are operated alternately or simultaneously to adjust the lifted positions of the back bottom section and the knee bottom section, there are such advantages that the operation is simple and does not require experience and that the respectively optimum lifted positions of the back bottom section and the knee bottom section can be reproduced at any time.

Furthermore, compared with a case where an interlocking mechanism is used to operate the back bottom section and the knee bottom section in an coordinative manner, the lifted positions can be delicately adjusted easily, and both the forward body sliding and the feeling of displeasure such as pressure feeling can be efficiently prevented.

Especially in the method of this invention for lifting the back bottom section and the knee bottom section in an coordinative manner in reference to elapsed time, since it is not necessary to install the means for continuously detecting the respective positions of the back bottom section and the knee bottom section, the cost can be decreased.

Furthermore, in this invention, position detecting means for detecting the lower limit positions of the back bottom section and the knee bottom section are installed, and the control means lifts the respective bottom sections in an coordinative manner subject to the condition that the position detecting means of the respective bottom sections detect the lower limit positions. Therefore, according to this method, even if the operation command means issues an coordinative lifting command to the control means, the control means does not lift the respective bottom sections in an coordinative manner unless the respective bottom sections stay at their lower limit positions. So, it does not happen safely that the respective bottom sections staying at lifted positions are further lifted.

The invention claimed is:

1. A method of controlling the lifting of bottom sections of lying furniture such as a bed that has a back bottom section for lifting the back portion of a lying person and a knee bottom section for lifting his/her knee portion, in which the respective bottom sections can be separately or simultaneously lifted by lifting mechanisms respectively provided for them, comprising: selectively issuing a command from an operating command means to a control means so that respective bottom sections can be operated by the respectively provided lifting mechanisms either respectively independently or in an coordinative manner, detecting the lower limit positions of said respective bottom sections by means of position detecting means, and transmitting to control means the lower limit position of the bottom sections which can be lifted in an coordinative manner.

2. The method of controlling the lifting of bottom sections of lying furniture such as a bed, according to claim 1, wherein control means does not accept a coordinative lifting command from the operation command means when the position detecting means does not detect the bottom sections to be in a lower limit position.

3. A method of controlling the lifting of bottom sections of lying furniture such as a bed, according to claim 2, further comprising initiate lifting of the back bottom section when all of the bottom sections are kept down to lie flat, and the knee bottom section begins to lift, then after lifting of the back bottom section begins, thereafter continue lifting of the knee bottom section until it reaches a preset highest position, and then begin lowering the knee bottom section when the back bottom section is lifted to a predetermined high position, wherein a time instant when lifting of the back bottom section is started later than a time instant when the lifting of the knee bottom section is started, and/or a time instant when the knee bottom section reaches the highest position is determined in reference to time elapsed after a time instant when the lifting of the knee bottom section is started.

4. The method of controlling the lifting of bottom sections of lying furniture such as a bed, according to claim 1, comprising: the lowering respective bottom sections in response to an coordinative lifting command from the operation command means to the control means when the position detecting means does not detect the bottom sections in a lower limit position.

5. A method of controlling the lifting of bottom sections of lying furniture such as a bed, according to claim 4, further comprising initiate lifting of the back bottom section when all of the bottom sections are kept down to lie flat, and the knee bottom section begins to lift, then after lifting of the back bottom section begins, thereafter continue lifting of the knee bottom section until it reaches a preset highest position, and then begin lowering the knee bottom section when the back bottom section is lifted to a predetermined high position, wherein a time instant when lifting of the back bottom section is started later than a time instant when the lifting of the knee bottom section is started, and/or a time instant when the knee bottom section reaches the highest position is determined in reference to time elapsed after a time instant when the lifting of the knee bottom section is started.

6. The method of controlling the lifting of bottom sections of lying furniture such as a bed, according to claim 1, comprising lowering the respective bottom sections in response to a coordinative lifting command from the operation command means to the control means when the position detecting means does not detect the bottom sections in a lower limit position and lifting the respective bottom sections in a coordinative manner when the position detecting means detects the lower limit position of the bottom sections.

7. A method of controlling the lifting of bottom sections of lying furniture such as a bed, according to claim 6, further comprising initiate lifting of the back bottom section when all of the bottom sections are kept down to lie flat, and the knee bottom section begins to lift, then after lifting of the back bottom section begins, thereafter continue lifting of the knee bottom section until it reaches a preset highest position, and then begin lowering the knee bottom section when the back bottom section is lifted to a predetermined high position, wherein a time instant when lifting of the back bottom section is started later than a time instant when the lifting of the knee bottom section is started, and/or a time instant when the knee bottom section reaches the highest position is determined in reference to time elapsed after a time instant when the lifting of the knee bottom section is started.

8. The method of controlling the lifting of bottom sections of lying furniture such as a bed, according to claim 1, further comprising counting time elapsed in the control means in response to a coordinative lifting command from the operation command means when the detecting means does not detect a lower limit position of the bottom sections, lowering respective bottom sections by the control means if the control means standing by in this state receives another coordinative lifting command within a predetermined time, and lifting the respective bottom sections in a coordinative manner by the control means if the position detecting means of the respective bottom sections detect the lower limit positions.

9. A method of controlling the lifting of bottom sections of lying furniture such as a bed, according to claim 8, further comprising initiate lifting of the back bottom section when all of the bottom sections are kept down to lie flat, and the knee bottom section begins to lift, then after lifting of the back bottom section begins, thereafter continue lifting of the knee bottom section until it reaches a preset highest position, and then begin lowering the knee bottom section when the back bottom section is lifted to a predetermined high position, wherein a time instant when lifting of the back bottom section is started later than a time instant when the lifting of the knee bottom section is started, and/or a time instant when the knee bottom section reaches the highest position is determined in reference to time elapsed after a time instant when the lifting of the knee bottom section is started.

10. A method of controlling the lifting of bottom sections of lying furniture such as a bed, according to claim 1, further comprising initiate lifting of the back bottom section when all of the bottom sections are kept down to lie flat, and the knee bottom section begins to lift, then after lifting of the back bottom section begins, thereafter continue lifting of the knee bottom section until it reaches a preset highest position, and then begin lowering the knee bottom section when the back bottom section is lifted to a predetermined high position, wherein a time instant when lifting of the back bottom section is started later than a time instant when the lifting of the knee bottom section is started, and/or a time instant when the knee bottom section reaches the highest position is determined in reference to time elapsed after a time instant when the lifting of the knee bottom section is started.

* * * * *